US006920222B1

(12) United States Patent
Tsukahara et al.

(10) Patent No.: US 6,920,222 B1
(45) Date of Patent: Jul. 19, 2005

(54) CONDITIONAL ACCESS SYSTEM ENABLING PARTIAL VIEWING

(76) Inventors: Daisuke Tsukahara, c/o Mitsubishi Denki Kabushiki Kaisha, 2-3, Marunouchi 2-chome, Chiyoda-ku, Tokyo 100-8310 (JP); Yasutaka Akita, c/o Mitsubishi Denki Kabushiki Kaisha, 2-3, Marunouchi 2-chome, Chiyoda-ku, Tokyo 100-8310 (JP); Susumu Oka, c/o Mitsubishi Denki Kabushiki Kaisha, 2-3, Marunouchi 2-chome, Chiyoda-ku, Tokyo 100-8310 (JP); Tokumichi Murakami, c/o Mitsubishi Denki Kabushiki Kaisha, 2-3, Marunouchi 2-chome, Chiyoda-ku, Tokyo 100-8310 (JP); Yukinari Matsuda, c/o Mitsubishi Denki Kabushiki Kaisha, 2-3, Marunouchi 2-chome, Chiyoda-ku, Tokyo 100-8310 (JP)

( * ) Notice: Subject to any disclaimer, the term of this patent is extended or adjusted under 35 U.S.C. 154(b) by 893 days.

(21) Appl. No.: 09/641,512

(22) Filed: Aug. 18, 2000

(30) Foreign Application Priority Data

Dec. 21, 1999 (JP) .......................................... 11-363297

(51) Int. Cl.$^7$ ............................................... H04N 7/167
(52) U.S. Cl. ....................... 380/239; 380/210; 380/241; 725/31
(58) Field of Search .............................. 380/210, 239, 380/241; 725/31

(56) References Cited

U.S. PATENT DOCUMENTS 5,311,325 A    5/1994  Edwards et al.
5,442,701 A    8/1995  Guillou et al.
5,742,681 A    4/1998  Giachetti et al.
6,157,719 A  * 12/2000  Wasilewski et al. ........ 380/210
2004/0068541 A1 * 4/2004  Bayassi et al. ............. 709/204

FOREIGN PATENT DOCUMENTS

| CN | 1116027 A   | 1/1996 |
| EP | 0708561 A2  | 4/1996 |
| GB | 227017 A    | 7/1996 |
| GB | 2297017 A   | 7/1996 |
| WO | WO99/07149  | 2/1999 |

OTHER PUBLICATIONS

Telecommunications Technology Counsel Report, Advisory No. 74, pp. 98–122 (Jul. 24, 1995).

* cited by examiner

Primary Examiner—Emmanuel L. Moise
Assistant Examiner—Taghi T. Arani
(74) Attorney, Agent, or Firm—Birch, Stewart, Kolasch & Birch LLP

(57) ABSTRACT

A conditional access system includes an EMM (Entitlement Management Message) analyzer for retrieving partial viewing authorization information. When the partial viewing authorization information permits partial viewing, ECM (Entitlement Control Message) is decrypted using work keys, and scrambling keys are intermittently retrieved from the ECM. This can solve a problem of a conventional conditional access system in that an unauthorized user's receiver cannot display pictures at all because the receiver cannot retrieve scrambling keys, and hence the user cannot enjoy a program even to such a degree as to perceive its feeling as in analog broadcasting systems, and thus the user cannot decide as to whether to make contract or not with viewing the program to some extent, which prevents the provider of the program from offering effective invitation to the user.

19 Claims, 12 Drawing Sheets

CONDITIONAL ACCESS SYSTEM ENABLING PARTIAL VIEWING

BACKGROUND OF THE INVENTION

1. Field of the Invention

The present invention relates to a conditional access system allowing only specific receivers to receive video and audio digital signals which are broadcast or delivered via media such as satellite waves, terrestrial waves or cables.

2. Description of Related Art

FIG. 12 is a block diagram showing a conventional conditional access system described in Telecommunications Technology Counsel Report, Advisory No. 74. In this figure, the reference numeral 1 designates a system controller for generating and managing various keys and subscriber contract information; 2 designates a scrambling processor for encrypting coded media data output from sources like encoders on a transmitting side using scrambling keys output from the system controller 1; 3 designates an ECM (Entitlement Control Message) generator for generating an ECM from the scrambling keys used for encrypting the coded media data and from program associated information including a broadcasting type of a program and charge information: and 4 designates an ECM encryption section for encrypting the ECM using work keys output from the system controller 1.

The reference numeral 5 designates an EMM (Entitlement Management Message) generator for generating an EMM from the work keys used for encrypting the ECM and from subscriber contract information for each receiver; 6 designates an EMM encryption section for encrypting the EMM using a master key output from the system controller 1; 7 designates a multiplexer for generating a packet stream by multiplexing encrypted coded media data, ECM and EMM, and for supplying the packet stream to a transmission path 8 for transmitting the packet stream.

The reference numeral 9 designates a demultiplexer for demultiplexing the packet stream transmitted from the transmitting site into the encrypted coded media data, ECM and EMM; 10 designates a master key managing section for storing in advance a master key used for decrypting the EMM; and 11 designates an EMM analyzer for retrieving from the EMM the subscriber contract information and work keys using the master key stored in the master key managing section 10. The EMM analyzer 11 outputs the work keys only when the subscriber contract information authorizes viewing.

The reference numeral 12 designates an ECM analyzer for decrypting the ECM using the work keys supplied from the EMM analyzer 11, and for retrieving the scrambling keys from the ECM; 13 designates a descrambling processor for descrambling the coded media data using the scrambling keys supplied from the ECM analyzer 12; 14 designates a media decoding section for decoding the coded media data descrambled by the descrambling processor 13; and 15 designates a television receiver for displaying pictures and outputting voices in response to the coded media data decoded by the media decoding section 14.

Next, the operation of the conventional conditional access system will be described.

First, on the transmitting side, the scrambling processor 2 in the transmitting site encrypts the coded media data output from encoders or the like when the coded media data is specific coded media data to be scrambled, such as pay programs.

The ECM generator 3 places into the ECM the scrambling keys used for the encryption, the program associated information indicating the broadcasting type of the program, etc., and the ECM encryption section 4 encrypts the ECM. However, it usually does not encrypt the program associated information in the ECM.

The EMM generator 5 places into the EMM the work keys used in the encryption, the subscriber contract information for each receiver, etc., and the EMM encryption section 6 encrypts the EMM using the master key prepared for the individual receivers. However, it usually does not encrypt the subscriber contract information in the EMM.

Then, the multiplexer 7 multiplexes the encrypted coded media data, encrypted ECM and encrypted EMM, and supplies the multiplexed data to the transmission path 8, through which the various pieces of the information are transmitted as a packet stream.

The packet stream sent from the transmitting side passes through the transmission path 8, and is received by the demultiplexer 9 on the receiving side. On the receiving side, the demultiplexer 9 in the receiving site extracts the encrypted EMM from the packet stream, first. Then, the EMM analyzer 11 decrypts the EMM using the master key stored in the master key managing section 10 for individual receivers, and retrieves from the EMM the subscriber contract information and work keys (since the subscriber contract information is not usually encrypted, it can be referred to without the decryption).

The EMM analyzer 11 supplies the work keys to the ECM analyzer 12 only when the subscriber contract information authorizes the viewing.

Receiving the work keys from the EMM analyzer 11, the ECM analyzer 12 decrypts the encrypted ECM using the work keys, retrieves the scrambling keys from the ECM, and supplies the scrambling keys to the descrambling processor 13.

Receiving the scrambling keys from the ECM analyzer 12, the descrambling processor 13 descrambles the coded media data using the scrambling keys, and the media decoding section 14 decodes the coded media data descrambled by the descrambling processor 13.

The decoded coded media data is transferred to the television receiver 15 that displays pictures and outputs voices.

With the foregoing configuration, the conventional conditional access system authorizes only specific users' receivers to descramble the coded media data in accordance with the contents of the subscriber contract information. The receivers of unauthorized users, however, cannot retrieve the scrambling keys, and hence the unauthorized users cannot view programs at all. Thus, they cannot view even fragments of pictures of programs, and hence cannot have slightest feelings about the programs as in analog broadcasts. As a result, they cannot decide as to whether they make a new contract or not after trial viewing of some programs, which prevents the providers from making effective invitation to their programs.

SUMMARY OF THE INVENTION

The present invention is implemented to solve the foregoing problem. It is therefore an object of the present invention to provide a conditional access system capable of allowing unauthorized users to watch pictures to some extent in order to increase their desire for programs, thereby making effective invitation to the programs.

According to one aspect of the present invention, there is provided a conditional access system comprising: a demultiplexer for demultiplexing a packet stream transmitted from a transmitting site into encrypted coded media data, an ECM (Entitlement Control Message) and an EMM (Entitlement Management Message); an EMM decryption section for retrieving work keys and subscriber contract information from the EMM extracted by the demultiplexer; means for retrieving partial viewing authorization information included in one of the EMM and ECM extracted by the multiplexer; an ECM decryption section for decrypting the ECM using the work keys, and for retrieving scrambling keys from the ECM; and outputting means for descrambling and decoding part of the coded media data using the scrambling keys when the partial viewing authorization information permits partial viewing, and for outputting the partially decoded coded media data.

Here, the ECM decryption section may comprise: means for intermittently retrieving the scrambling keys from the ECM when the subscriber contract information inhibits viewing and the partial viewing authorization information permits partial viewing, and wherein the outputting means comprises: a media data descrambling section for descrambling the coded media data using the scrambling keys retrieved by the ECM decryption section; and a decoding section for decoding the coded media data descrambled by the media data descrambling section.

The means for intermittently retrieving the scrambling keys may comprise: a decryption validity decision section for outputting decryption control information in response to the subscriber contract information and the partial viewing authorization information; and a decryption processor for intermittently retrieving the scrambling keys from the ECM in response to the decryption control information when the subscriber contract information inhibits viewing and the partial viewing authorization information permits partial viewing.

The means for intermittently retrieving the scrambling keys may comprises: a decryption processor for retrieving all scrambling keys included in the ECM; a scrambling key output validity decision section for outputting output control information in response to the subscriber contract information and the partial viewing authorization information; and an output controller for supplying the media data descrambling section with only part of the scrambling keys in response to the output control information when the subscriber contract information inhibits viewing and the partial viewing authorization information permits partial viewing.

The outputting means may comprise: a media data descrambling section for intermittently descrambling the coded media data using the scrambling keys when the subscriber contract information inhibits viewing and the partial viewing authorization information permits partial viewing; and a decoding section for decoding the coded media data descrambled by the media data descrambling section.

The media data descrambling section may comprise: a descramble validity decision section for outputting descramble control information alternately authorizing and inhibiting descrambling when the subscriber contract information inhibits viewing and the partial viewing authorization information permits partial viewing; a descrambler for descrambling part of the coded media data in response to the descramble control information; and a scramble control information modifier for handling part of the coded media data which is not descrambled as unencrypted data.

The outputting means may comprise: a media data descrambling section for descrambling the coded media data using the scrambling keys retrieved by the ECM decryption section; and a decoding section for intermittently decoding the coded media data descrambled by the media data descrambling section, when the subscriber contract information inhibits viewing and the partial viewing authorization information permits partial viewing.

The decoding section may comprise: a decoding validity decision section for outputting decoding control information in response the subscriber contract information and the partial viewing authorization information; and a decoding processor for decoding only part of frames in a frame sequence constituting the coded media data in response to the decoding control information when the subscriber contract information inhibits viewing and the partial viewing authorization information permits partial viewing.

The decoding processor may decode only I frames in response to the decoding control information when the subscriber contract information inhibits viewing and the partial viewing authorization information permits partial viewing.

The decoding section may comprise: a decoding processor for decoding all the coded media data descrambled by the media data descrambling section; and a media display controller for supplying only part of the descrambled coded media data to a television receiver when the subscriber contract information inhibits viewing and the partial viewing authorization information permits partial viewing.

The outputting means may comprise: a media data descrambling section for descrambling the coded media data using the scrambling keys retrieved by the ECM decryption section; and a decoding section for decoding the coded media data descrambled by the media data descrambling section, for storing the decoded coded media data into a memory on a block by block basis, and for outputting the blocks with changing their sequence when the subscriber contract information inhibits viewing and the partial viewing authorization information permits partial viewing.

The EMM decryption section may comprise means for intermittently retrieving work keys from the EMM when the subscriber contract information inhibits viewing and the partial viewing authorization information permits partial viewing, the ECM decryption section may decrypt the ECM using the work keys and retrieves scrambling keys from the ECM, and the outputting means may comprise: a media data descrambling section for descrambling the coded media data using the scrambling keys retrieved by the ECM decryption section; and a decoding section for decoding the coded media data descrambled by the media data descrambling section.

The means for intermittently retrieving work keys may comprise: a decryption validity decision section for outputting decryption control information in response to the subscriber contract information and the partial viewing authorization information; and a decryption processor for retrieving only part of the work keys from the EMM in response to the decryption control information when the subscriber contract information inhibits viewing and the partial viewing authorization information permits partial viewing.

The means for intermittently retrieving work keys may comprise: a decryption processor for retrieving all the work keys included in the EMM; a work key output validity decision section for outputting output control information about the work keys in response to the subscriber contract information and the partial viewing authorization information; and a work key output controller for supplying only part of the work keys to the ECM decryption section in response to the output control information when the subscriber contract information inhibits viewing and the partial viewing authorization information permits partial viewing.

The partial viewing authorization information may include a control parameter indicating a partially authorized viewable range.

The partial viewing authorization information may consist of information authorizing viewing only for a specific time period.

The subscriber contract information that includes information authorizing partial viewing may be used as the partial viewing authorization information.

The EMM may be used into which the work keys are inserted only for specific time periods.

The demultiplexer and the decoding section may be based on the MPEG-2 standard.

The conditional access system may determine, when a plurality of programs are multiplexed into the packet stream transmitted from the transmitting site, authorization, partial authorization and inhibition of viewing the programs for individual programs independently.

DETAILED DESCRIPTION OF THE PREFERRED EMBODIMENTS

The invention will now be described with reference to the accompanying drawings.

Embodiment 1

Figure 1:
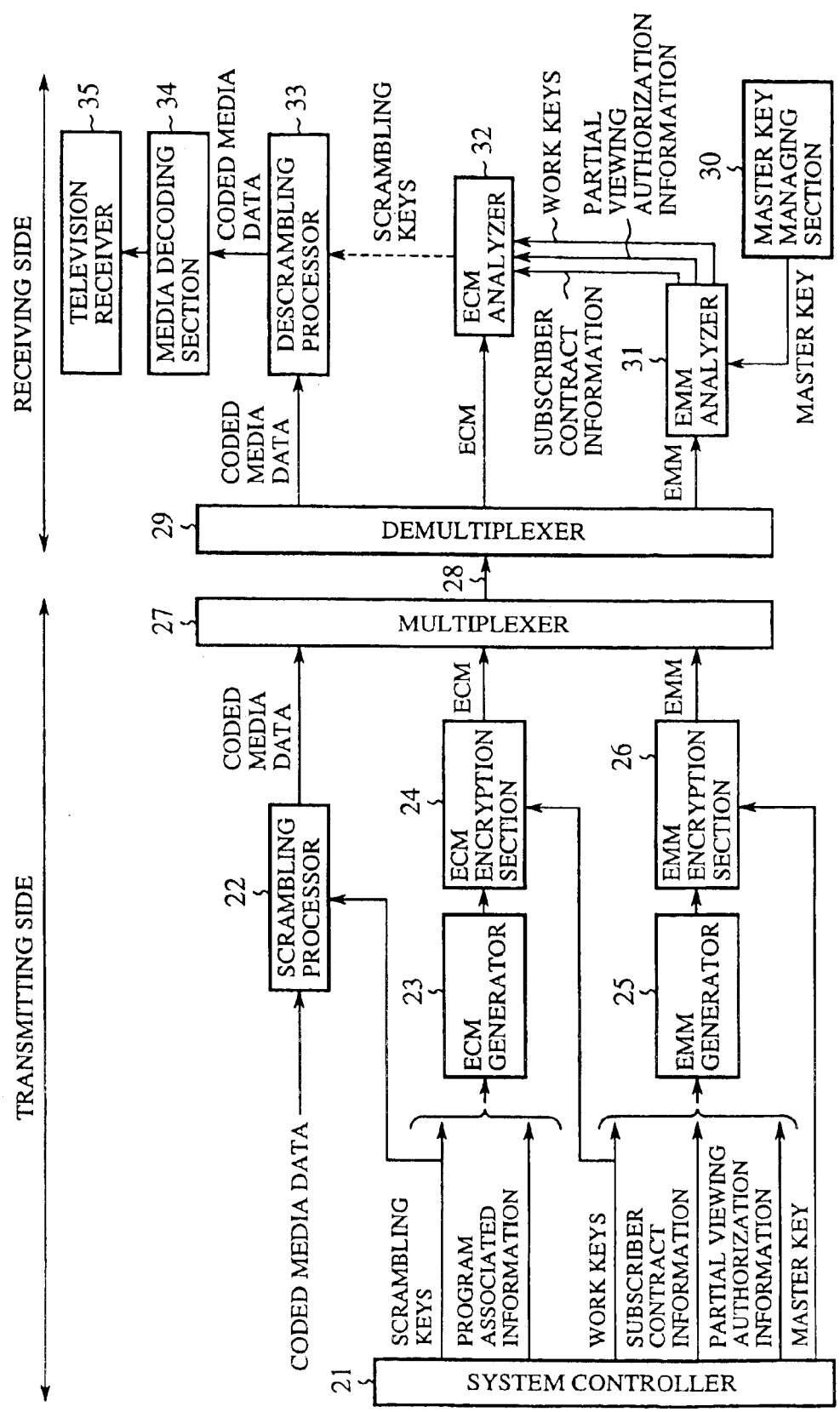
FIG. 1 is a block diagram showing a configuration of an embodiment 1 of a conditional access system in accordance with the present invention.

FIG. 1 is a block diagram showing a configuration of an embodiment 1 of a conditional access system in accordance with the present invention. In this figure, the reference numeral 21 designates a system controller for generating and managing various keys and subscriber contract information; 22 designates a scrambling processor for encrypting coded media data (program signals) output from sources such as encoders on a transmitting side using scrambling keys output from the system controller 21; 23 designates an ECM generator for generating an ECM from the scrambling keys used for encrypting the coded media data and from program associated information including a broadcasting type of a program, charge information etc.; and 24 designates an ECM encryption section for encrypting the ECM using work keys output from the system controller 21.

The reference numeral 25 designates an EMM generator for generating EMM from the work keys used for encrypting the ECM, from the subscriber contract information of individual receivers and from partial viewing authorization information; 26 designates an EMM encryption section for encrypting the EMM with the master key output from the system controller 21; 27 designates a multiplexer for multiplexing the encrypted coded media data, ECM and EMM into a packet stream, and for supplying the packet stream to the transmission path 28 to be transmitted.

The reference numeral 29 designates a demultiplexer for demultiplexing the packet stream sent from the transmitting site into the encrypted coded media data, ECM and EMM; 30 designates a master key managing section for prestoring a master key for decrypting the EMM; 31 designates an EMM analyzer for retrieving from the EMM the subscriber contract information, partial viewing authorization information and work keys using the master key stored in the master key managing section 30. The EMM analyzer 31 outputs the work keys when the subscriber contract information authorizes viewing or the partial viewing authorization information permits partial viewing. The master key managing section 30 and EMM analyzer 31 constitute an EMM decryption section.

The reference numeral 32 designates an ECM analyzer (ECM decryption section) for decrypting the ECM using the work keys supplied from the EMM analyzer 31, and for retrieving the scrambling keys from the ECM when the subscriber contract information authorizes viewing or the partial viewing authorization information permits partial viewing. In particular, the ECM analyzer 32 intermittently retrieves the scrambling keys from the ECM when the subscriber contract information inhibits viewing and the partial viewing authorization information permits partial viewing.

The reference numeral 33 designates a descrambling processor (media data descrambling section) for descrambling the coded media data using the scrambling keys it receives from the ECM analyzer 32; 34 designates a media decoding section (decoding section) for decoding the coded media data descrambled by the descrambling processor 33; and 35 designates a television receiver for displaying pictures and outputting voices in response to the coded media data decoded by the media decoding section 34.

Figure 2:
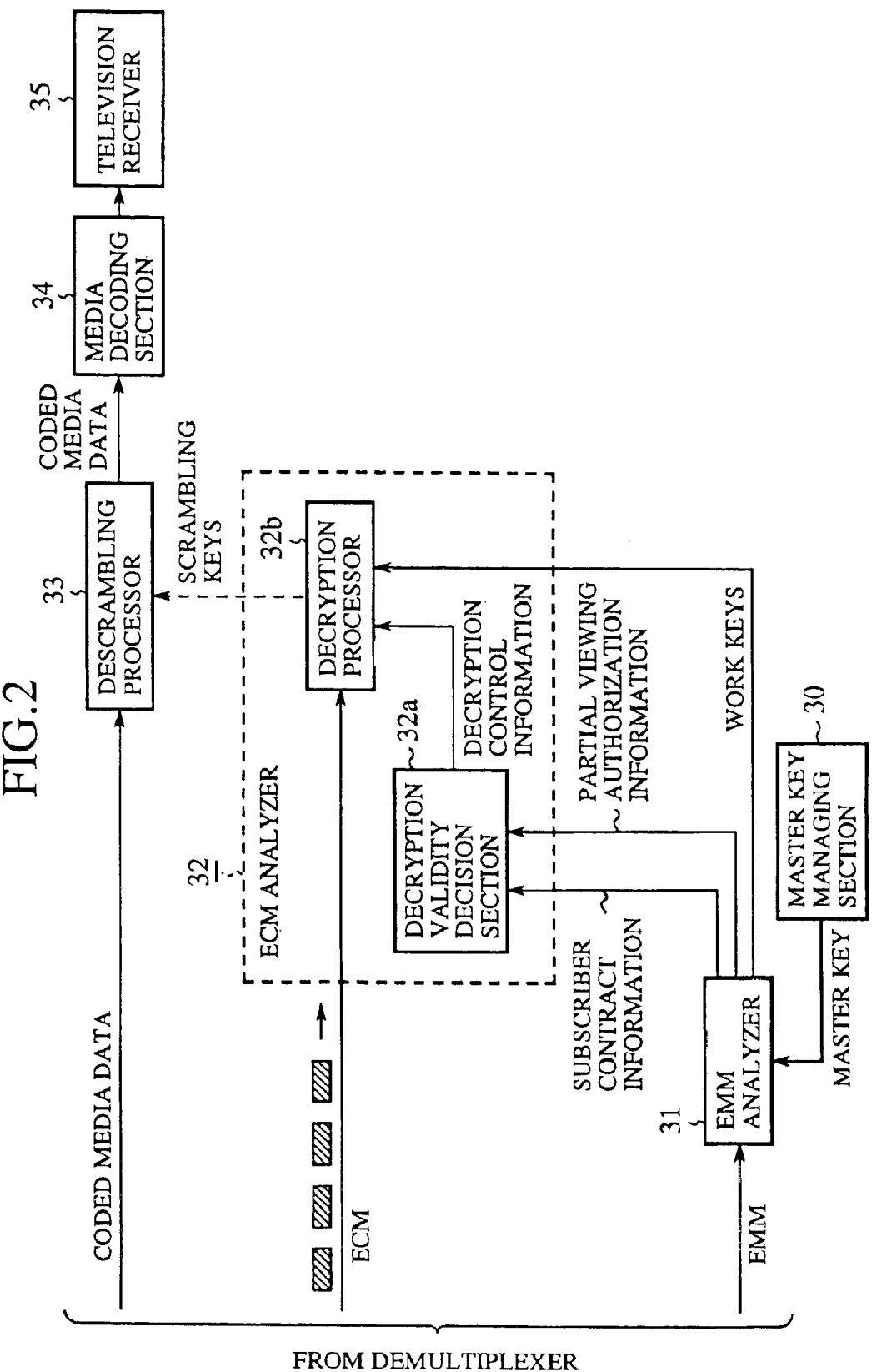
FIG. 2 is a block diagram showing an internal configuration of the ECM analyzer 32 of the embodiment 1.

FIG. 2 is a block diagram showing an internal configuration of the ECM analyzer 32. In this figure, the reference numeral 32a designates a decryption validity decision section for generating, in response to the subscriber contract information and the partial viewing authorization information, decryption control information for controlling a decryption processing of the ECM; 32b designates a decryption processor for decrypting the ECM in response to the decryption control information generated by the decryption validity decision section 32a.

Next, the operation of the present embodiment 1 will be described.

On the transmitter side, the scrambling processor 22 in the transmitting site encrypts (scrambles) the coded media data output from encoders or the like when the coded media data is specific coded media data to be scrambled such as pay programs.

The ECM generator 23 places into the ECM the scrambling key used for the encryption and the program associated information indicating the program broadcasting type and the like, and the ECM encryption section 24 encrypts the ECM. However, it does not usually encrypt the program associated information in the ECM.

At the same time, the EMM generator 25 places into the EMM the work keys used for the encryption, the subscriber contract information for each receiver and the partial viewing authorization information, and the EMM encryption section 26 encrypts the EMM. However, it does not usually encrypt the subscriber contract information and the partial viewing authorization information in the EMM. The encryption is carried out using the master keys assigned to each receiver.

Then the multiplexer 27 multiplexes the encrypted coded media data, encrypted ECM and encrypted EMM into one stream, and supplies it to the transmission path 28 to be transmitted as a packet stream.

The packet stream transmitted from the transmitting side passes through the transmission path 28, and is received by the demultiplexer 29 on the receiving side. On the receiving side, the demultiplexer 29 in the receiving site extracts the encrypted EMM from the packet stream, first. Then, the EMM analyzer 31 decrypts the EMM using the master key stored in the master key managing section 30 of each receiver, and retrieves from the EMM the subscriber contract information, the partial viewing authorization information and the work keys (the subscriber contract information and the partial viewing authorization information can be referred to without passing through the decryption processing because they are not usually decrypted).

The EMM analyzer 31 supplies the work keys to the ECM analyzer 32 when the subscriber contract information authorizes viewing or the partial viewing authorization information permits partial viewing. In contrast, it does not supply the work keys to the ECM analyzer 32 when the subscriber contract information inhibits the viewing and the partial viewing authorization information inhibits the partial viewing.

Receiving the work keys from the EMM analyzer 31, the ECM analyzer 32 decrypts the encrypted ECM using the work keys, and retrieves the scrambling keys from the ECM.

Specifically, when the subscriber contract information authorizes viewing, the decryption validity decision section 32a in the ECM analyzer 32 supplies the decryption processor 32b with the decryption control information which authorizes decryption regardless of the contents of the partial viewing authorization information.

In this case, the decryption processor 32b continuously retrieves the scrambling keys from the ECM.

On the other hand, when the subscriber contract information inhibits viewing; and the partial viewing authorization information permits partial viewing, the decryption validity decision section 32a supplies the decryption processor 32b alternately with the decryption control information authorizing the decryption and the decryption control information inhibiting the decryption.

In this case, the decryption processor 32b intermittently retrieves the scrambling keys from the ECM.

When both the subscriber contract information and partial viewing authorization information inhibit viewing and partial viewing, the decryption validity decision section 32a in the ECM analyzer 32 supplies the decryption processor 32b with the decryption control information that inhibits the decryption.

In this case, the decryption processor 32b does not retrieve the scrambling keys from the ECM.

Receiving the scrambling keys from the ECM analyzer 32, the descrambling processor 33 decrypts (descrambles) the coded media data using the scrambling keys, and the media decoding section 34 decodes the coded media data descrambled by the descrambling processor 33.

The television receiver 35 displays pictures and outputs voices in response to the decoded coded media data supplied thereto.

Although the television receiver 35 can display the pictures properly because of the correctly decrypted coded media data when the descrambling processor 33 receives the scrambling keys continuously, it can only display improper pictures when the descrambling processor 33 receives the scrambling keys intermittently. This is because the television receiver 35 receives only the incorrectly decrypted coded media data (because only part of the coded media data is decrypted with the scrambling keys different from the authorized scrambling keys)

Thus, by adjusting the frequency of correct decryption of the coded media data, that is, the frequency of the retrievals of the scrambling keys form the ECM by the ECM analyzer 32, the television receiver 35 can display partially correct pictures so that a user can have only a feeling about the program as a whole.

As described above, the present embodiment 1 is configured such that it decrypts the ECM using the work keys when the partial viewing authorization information retrieved by the EMM analyzer 31 permits partial viewing, and intermittently retrieves the scrambling keys from the ECM. This offers an advantage of being able to authorize an unauthorized user to partially display pictures, and hence effectively increase desire of the user to subscribe to the provider.

Embodiment 2

Figure 3:
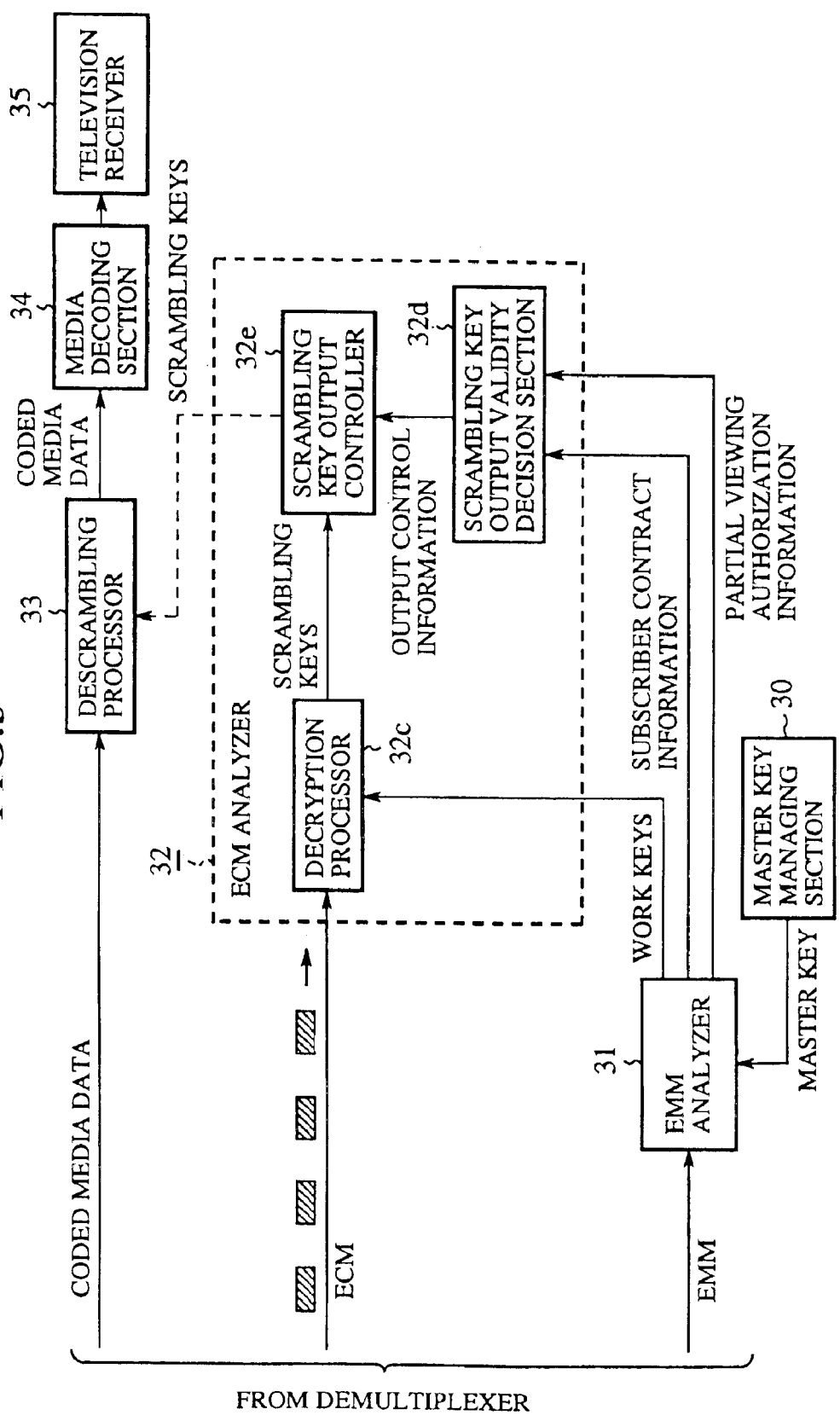
FIG. 3 is a block diagram showing an internal configuration of the ECM analyzer 32 of an embodiment 2 of the conditional access system in accordance with the present invention.

FIG. 3 is a block diagram showing an internal configuration of the ECM analyzer 32 of an embodiment 2 of the conditional access system in accordance with the present invention, in which the same reference numerals designate the same or like portions to those of FIG. 2, and the description thereof is omitted here.

In FIG. 3, the reference numeral 32c designates a decryption processor for retrieving the scrambling keys from the ECM using the work keys retrieved from the EMM analyzer 31; 32d designates a scrambling key output validity decision section for generating output control information for controlling the output of the scrambling keys in response to the subscriber contract information and partial viewing authorization information; and 32e designates a scrambling key output controller for controlling the output of the scrambling keys in response to the output control information generated by the scrambling key output validity decision section 32d.

Next, the operation of the present embodiment 2 will be described.

Although the foregoing embodiment 1 controls the ECM decryption processing in response to the subscriber contract information and partial viewing authorization information, this is not essential. For example, the output of the scrambling keys rather than the decryption thereof can be controlled using the subscriber contract information and partial viewing authorization information, achieving the same advantage as the foregoing embodiment 1.

More specifically, receiving the work keys from the EMM analyzer 31, the decryption processor 32c retrieves the scrambling keys from the ECM using the work keys regardless of the contents of the subscriber contract information and partial viewing authorization information, that is, retrieves all the scrambling keys from the ECM.

When the subscriber contract information authorizes viewing, the scrambling key output validity decision section 32d supplies the scrambling key output controller 32e with the output control information permitting the output of all the scrambling keys regardless of the contents of the partial viewing authorization information.

In this case, the scrambling key output controller 32e supplies the descrambling processor 33 with all the scrambling keys output from the decryption processor 32c.

When the subscriber contract information inhibits the viewing and the partial viewing authorization information permits partial viewing, the scrambling key output validity decision section 32d supplies the scrambling key output controller 32e with the output control information alternately enabling and disabling the output of the scrambling keys.

In this case, the scrambling key output controller 32e supplies the descrambling processor 33 with only selected ones among the scrambling keys output from the decryption processor 32c.

When neither the subscriber contract information nor the partial viewing authorization information authorizes the viewing or partial viewing, the scrambling key output validity decision section 32d supplies the scrambling key output controller 32e with the output control information disabling the output of the scrambling keys.

In this case, the scrambling key output controller 32e supplies the descrambling processor 33 with none of the scrambling keys output from the decryption processor 32c.

Embodiment 3

Figure 4:
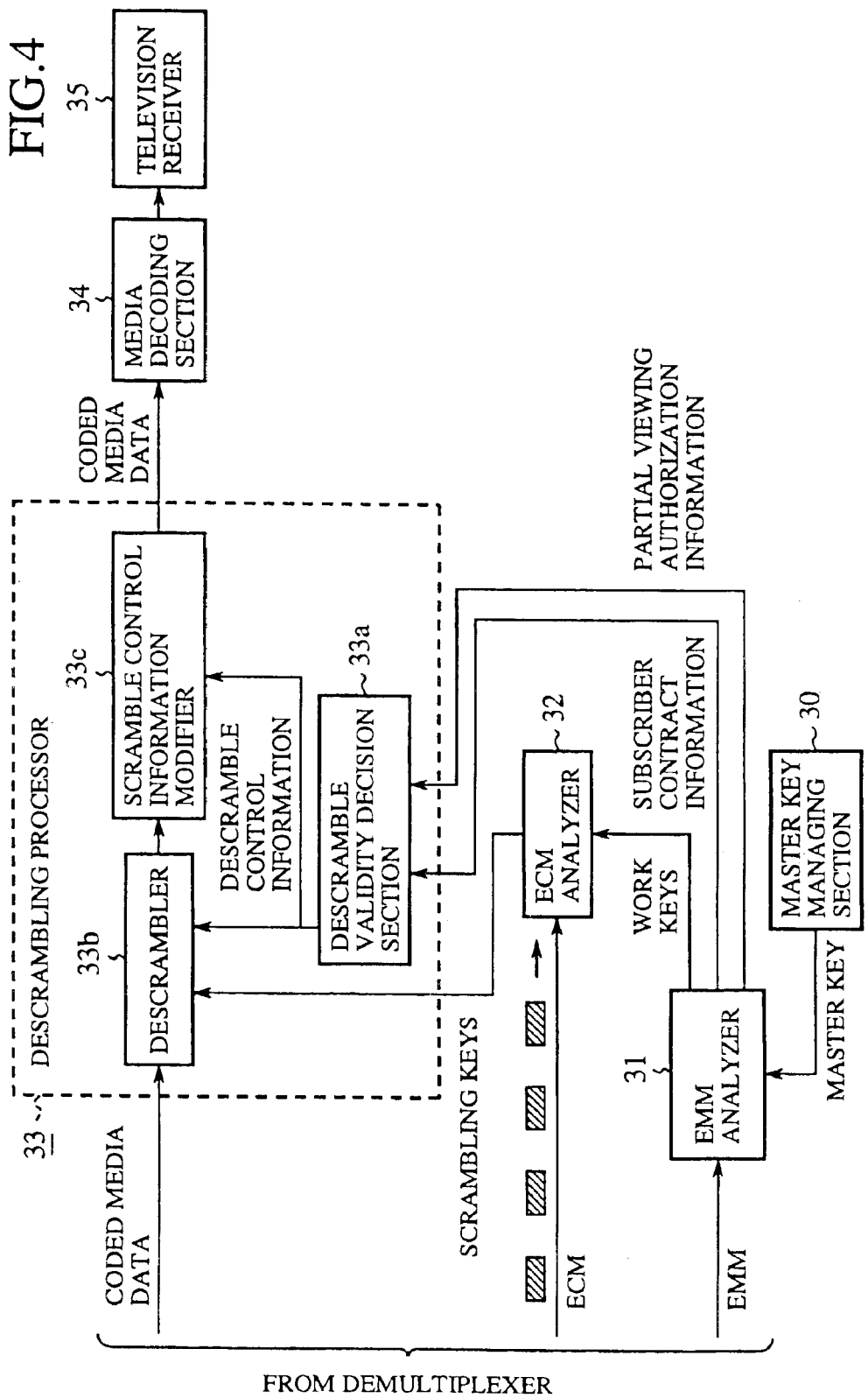
FIG. 4 is a block diagram showing an internal configuration of a descrambling processor 33 of an embodiment 3 of the conditional access system in accordance with the present invention.

FIG. 4 is a block diagram showing an internal configuration of the descrambling processor 33 of an embodiment 3 of the conditional access system in accordance with the present invention, in which the same or like portions to those of FIG. 3 are designated by the same reference numerals and the description thereof is omitted here.

In FIG. 4, the reference numeral 33a designates a descramble validity decision section for generating descramble control information for controlling the decryption processing of the coded media data in response to the subscriber contract information and partial viewing authorization information; 33b designates a descrambler for descrambling the coded media data using the scrambling keys retrieved from the ECM analyzer 32 only when the descramble validity decision section 33a outputs the descramble control information enabling the decryption of the coded media data; and 33c designates a scramble control information modifier for rewriting the scramble control information associated with the coded media data which is not decrypted by the descrambler 33b when the descramble validity decision section 33a outputs the descramble control information disabling the decryption of the coded media data, so that such coded media data will be handled as unencrypted data.

Next, the operation of the present embodiment 3 will be described.

Although in the foregoing embodiment 2 the ECM analyzer 32 controls the output of the scrambling keys in response to the subscriber contract information and partial viewing authorization information, this is not essential. For example, the descrambling processor 33 can control its decryption processing of the coded media data in response to the subscriber contract information and partial viewing authorization information, offering the same advantage as the foregoing embodiment 2.

More specifically, receiving the subscriber contract information and partial viewing authorization information from the EMM analyzer 31, the descramble validity decision section 33a supplies, when the subscriber contract information authorizes viewing, the descrambler 33b and scramble control information modifier 33c with the descramble control information enabling the decryption of the coded media data regardless of the contents of the partial viewing authorization information.

In this case, the descrambler 33b decrypts the coded media data using the scrambling keys retrieved by the ECM analyzer 32, and the scramble control information modifier 33c supplies the media decoding section 34 with the coded media data decrypted by the descrambler 33b without changing it.

On the other hand, when the subscriber contract information inhibits viewing and the partial viewing authorization information permits partial viewing, the descramble validity decision section 33a supplies both the descrambler 33b and scramble control information modifier 33c with the descramble control information alternately enabling and disabling the decryption.

In this case, the descrambler 33b decrypts part of the coded media data using the scrambling keys retrieved by the ECM analyzer 32: When the descrambler 33b decrypts the coded media data, the scramble control information modifier 33c supplies the decrypted coded media data to the media decoding section 34 without change; in contrast with this, when the descrambler 33b does not decrypt the coded media data, the scramble control information modifier 33c supplies the media decoding section 34 with the coded media data after rewriting the scramble control information associated with the coded media data so that the coded media data is handled as undecrypted data.

When both the subscriber contract information and partial viewing authorization information inhibit viewing, the descramble validity decision section 33a supplies both the descrambler 33b and scramble control information modifier 33c with the descramble control information disabling the decryption of the coded media data.

In this case, the descrambler 33b outputs the encrypted coded media data without decrypting it. The scramble control information modifier 33c supplies the undecrypted coded media data to the media decoding section 34 after rewriting the scramble control information associated with the undecrypted coded media data so that the undecrypted coded media data will be handled as encrypted data.

Thus, the media decoding section 34 cannot properly decode the coded media data not decrypted by the descrambler 33b. As a result, the television receiver 35 displays only partially correct pictures as in the foregoing embodiment 2.

Embodiment 4

Figure 5:
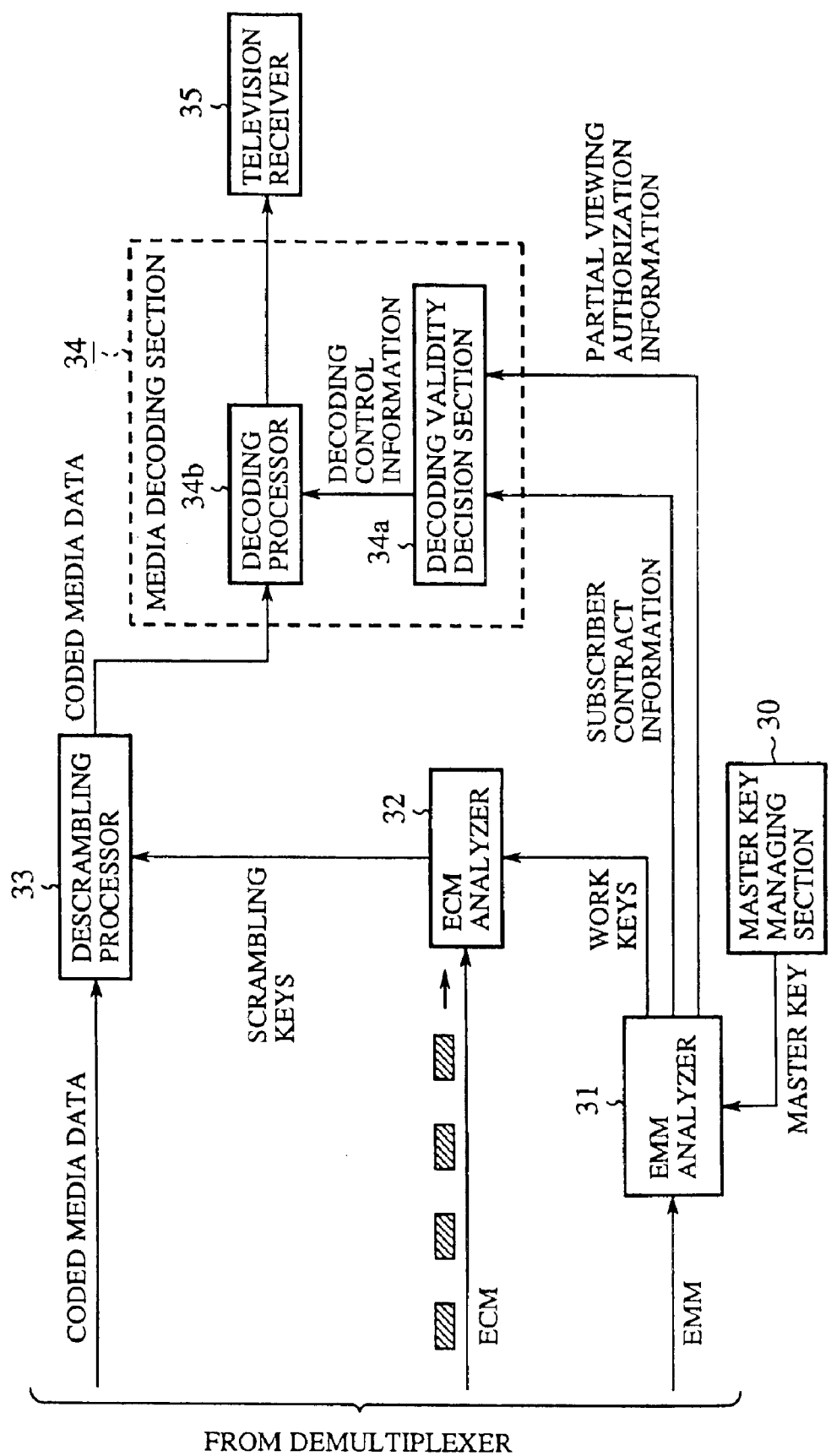
FIG. 5 is a block diagram showing an internal configuration of the media decoding section 34 of an embodiment 4 of the conditional access system in accordance with the present invention.

FIG. 5 is a block diagram showing an internal configuration of the media decoding section 34 in an embodiment 4 of the conditional access system in accordance with the present invention, in which the same reference numerals designate the same or like portions to those of FIG. 4, and the description thereof is omitted here.

In FIG. 5, the reference numeral 34a designates a decoding validity decision section for generating decoding control information for controlling the decoding processing of the coded media data in response to the subscriber contract information and partial viewing authorization information; and 34b designates a decoding processor for decoding the coded media data decrypted by the descrambling processor 33 only when the decoding validity decision section 34a outputs the decoding control information enabling the decoding of the coded media data.

Next, the operation of the present embodiment 4 will be described.

Although the descrambling processor 33 restricts the decryption processing of the coded media data in response to the subscriber contract information and partial viewing authorization information in the foregoing embodiment 3, this is not essential. For example, the media decoding section 34 rather than the descrambling processor 33 can restrict the decoding processing of the coded media data in response to the subscriber contract information and partial viewing authorization information, offering an advantage similar to that of the foregoing embodiment 3.

More specifically, receiving the subscriber contract information and partial viewing authorization information from the EMM analyzer 31, the decoding validity decision section 34a supplies, when the subscriber contract information authorizes decoding, the decoding processor 34b with the decoding control information enabling the decoding of the coded media data regardless of the content of the partial viewing authorization information.

In this case, the decoding processor 34b decodes the coded media data decrypted by the descrambling processor 33, and supplies it to the television receiver 35.

When the subscriber contract information inhibits viewing and the partial viewing authorization information permits partial viewing, the decoding validity decision section 34a supplies the decoding processor 34b with the decoding control information alternately enabling and disabling the decoding of the coded media data.

In this case, the decoding processor 34b decodes only fragments of the coded media data decrypted by the descrambling processor 33, and supplies them to the television receiver 35.

On the other hand, when both the subscriber contract information and partial viewing authorization information inhibit viewing, the decoding validity decision section 34a supplies the decoding processor 34b with the decoding control information disabling the decoding of the coded media data.

In this case, the decoding processor 34b supplies the television receiver 35 with the coded media data which is decrypted by the descrambling processor 33 without decoding it.

Since the television receiver 35 cannot properly display the coded media data not decoded by the decoding processor 34b, the television receiver 35 displays corrupted pictures as in the foregoing embodiment 3.

Embodiment 5

Although the decoding processing of the coded media data is restricted in the foregoing embodiment 4, it is also possible to selectively decode part of frames included in the coded media data such as I frames (intra-frame predictive coded frames) selected from a successive coded media data frame sequence.

This enables television receiver 35 to display pictures in a frame skipping state.

Embodiment 6

Figure 6:
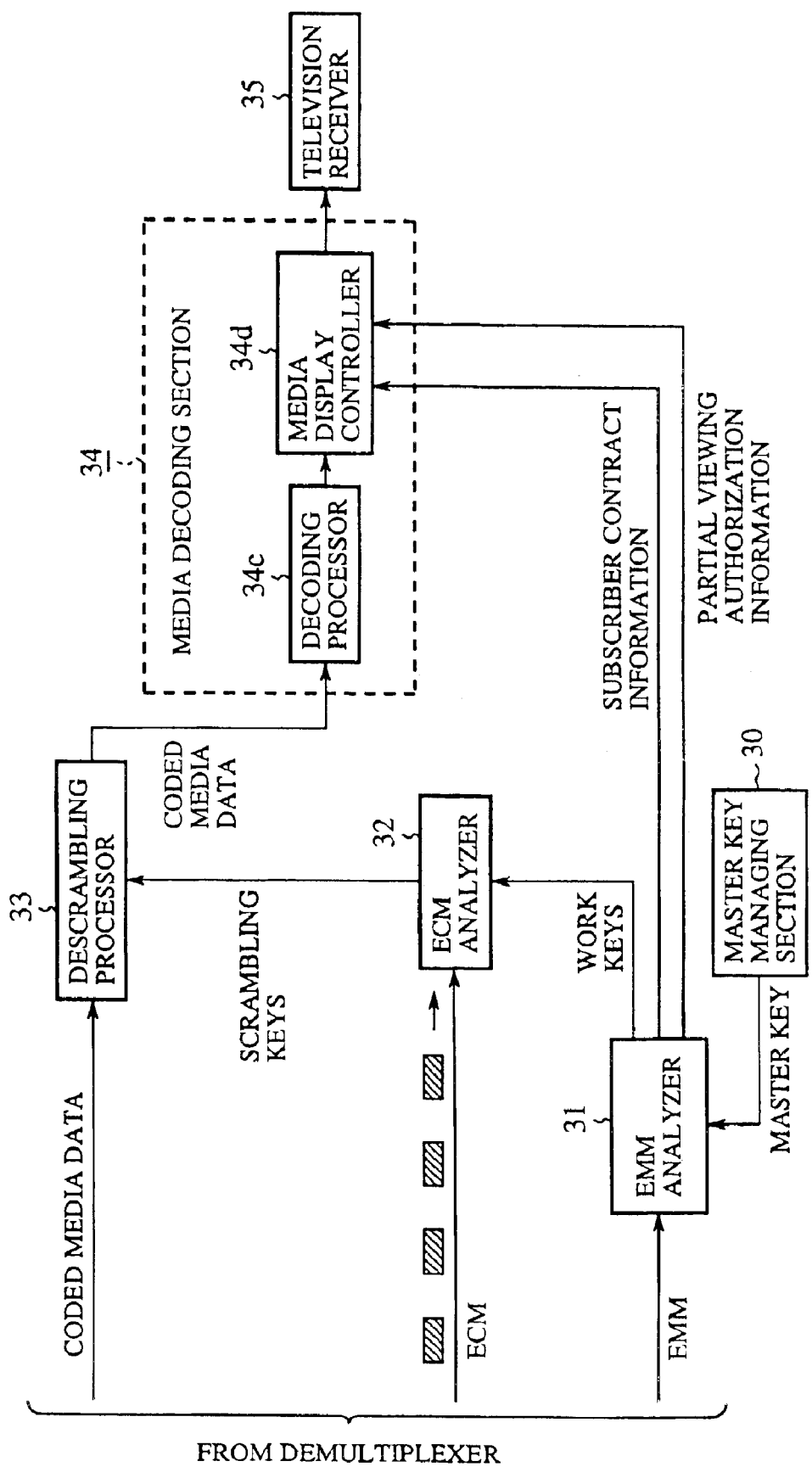
FIG. 6 is a block diagram showing an internal configuration of the media decoding section 34 of an embodiment 6 of the conditional access system in accordance with the present invention.

FIG. 6 is a block diagram showing an internal configuration of the media decoding section 34 in an embodiment 6 of the conditional access system in accordance with the present invention, in which the same reference numerals designate corresponding portions to those of FIG. 5, and hence the description thereof is omitted here.

In FIG. 6, the reference numeral 34c designates a decoding processor for decoding the coded media data decrypted by the descrambling processor 33; and 34d designates a media display controller for controlling the output of the coded media data in response to the subscriber contract information and partial viewing authorization information.

Next, the operation of the present embodiment 6 will be described.

Although the media decoding section 34 restricts the decoding processing of the coded media data in response to the subscriber contract information and partial viewing authorization information in the foregoing embodiment 4, this is not essential. For example, the coded media data decrypted by the descrambling processor 33 may be decoded in its entirety, and then its output may be restricted in response to the subscriber contract information and partial viewing authorization information, achieving an advantage similar to that of the foregoing embodiment 4.

More specifically, receiving the coded media data from the descrambling processor 33, the decoding processor 34c decodes the coded media data and supplies the decoded coded media data to the media display controller 34d regardless of the contents of the subscriber contract information and partial viewing authorization information.

The media display controller 34d receives the decoded coded media data from the decoding processor 34c, and supplies, when the subscriber contract information authorizes viewing, the decoded coded media data to the television receiver 35 regardless of the content of the partial viewing authorization information.

On the other hand, when the subscriber contract information inhibits viewing and the partial viewing authorization information permits partial viewing, the media display controller 34d supplies the television receiver 35 with only part of the decoded coded media data supplied from the decoding processor 34c, such as specific pictures (I pictures, for example).

When both the subscriber contract information and partial viewing authorization information inhibit viewing, the media display controller 34d does not supply the television receiver 35 with the decoded coded media data output from the decoding processor 34c.

Thus, when part of the decoded coded media data is transferred to the television receiver 35, it displays only part of the pictures in a frame skipping mode.

Embodiment 7

Figure 7:
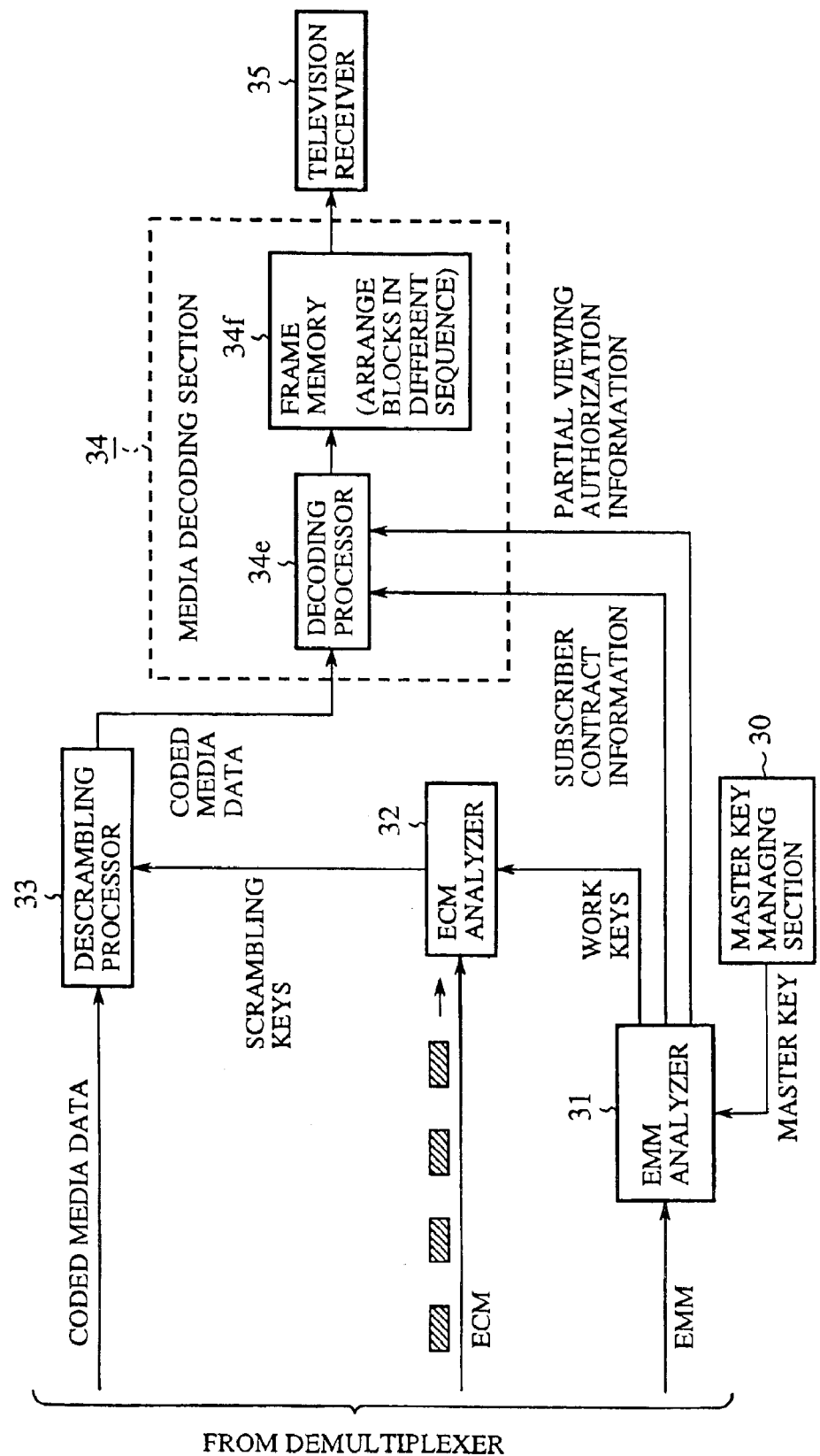
FIG. 7 is a block diagram showing an internal configuration of the media decoding section 34 of an embodiment 7 of the conditional access system in accordance with the present invention.

FIG. 7 is a block diagram showing an internal configuration of the media decoding section 34 in an embodiment 7 of the conditional access system in accordance with the present invention, in which the same reference numerals designate the same or like portions to those of FIG. 6, and the description thereof is omitted here.

In FIG. 7, the reference numeral 34e designates a decoding processor for decoding the coded media data decrypted by the descrambling processor 33, for storing decoded coded media data into a frame memory 34f, and for supplying the decoded coded media data stored in the frame memory 34f to the television receiver 35; and 34f designates the frame memory for temporarily storing the decoded coded media data.

Next, the operation of the present embodiment 7 will be described.

Although the media decoding section 34 controls the output of the decoded coded media data in response to the subscriber contract information and partial viewing authorization information in the foregoing embodiment 6, this is not essential. For example, the media decoding section 34 can once store the decoded coded media data into the frame memory 34f on a block by block basis, and then output the decoded coded media data with changing an order of the blocks, achieving an advantage similar to that of the foregoing embodiment 6.

More specifically, receiving the coded media data from the descrambling processor 33, the decoding processor 34e decodes the coded media data regardless of the content of the subscriber contract information and partial viewing authorization information, and stores the decoded coded media data into the frame memory 34f. In this case, the decoding processor 34e stores the decoded coded media data into the frame memory 34f on a block by block basis.

Subsequently, when the subscriber contract information authorizes viewing, the decoding processor 34e supplies the television receiver 35 with the decoded coded media data stored in the frame memory 34f regardless of the content of the partial viewing authorization information without changing the sequence of the blocks.

On the other hand, when the subscriber contract information inhibits viewing and the partial viewing authorization information permits partial viewing, the decoding processor 34e supplies the television receiver 35 with the decoded coded media data stored in the frame memory 34f with changing the order of the blocks.

When both the subscriber contract information and partial viewing authorization information inhibit viewing, the decoding processor 34e does not supply the television receiver 35 with the decoded coded media data stored in the frame memory 34f.

Thus, when the decoded coded media data stored in the frame memory 34f is supplied to the television receiver 35 with changing the sequence of the blocks, it can display pictures at random on a block by block basis, although individual pictures in each block will be correctly displayed. Thus, by controlling the timing of changing the order of the blocks, the picture display is achieved such that a user can have a feeling of the program as a whole.

Embodiment 8

Figure 8:
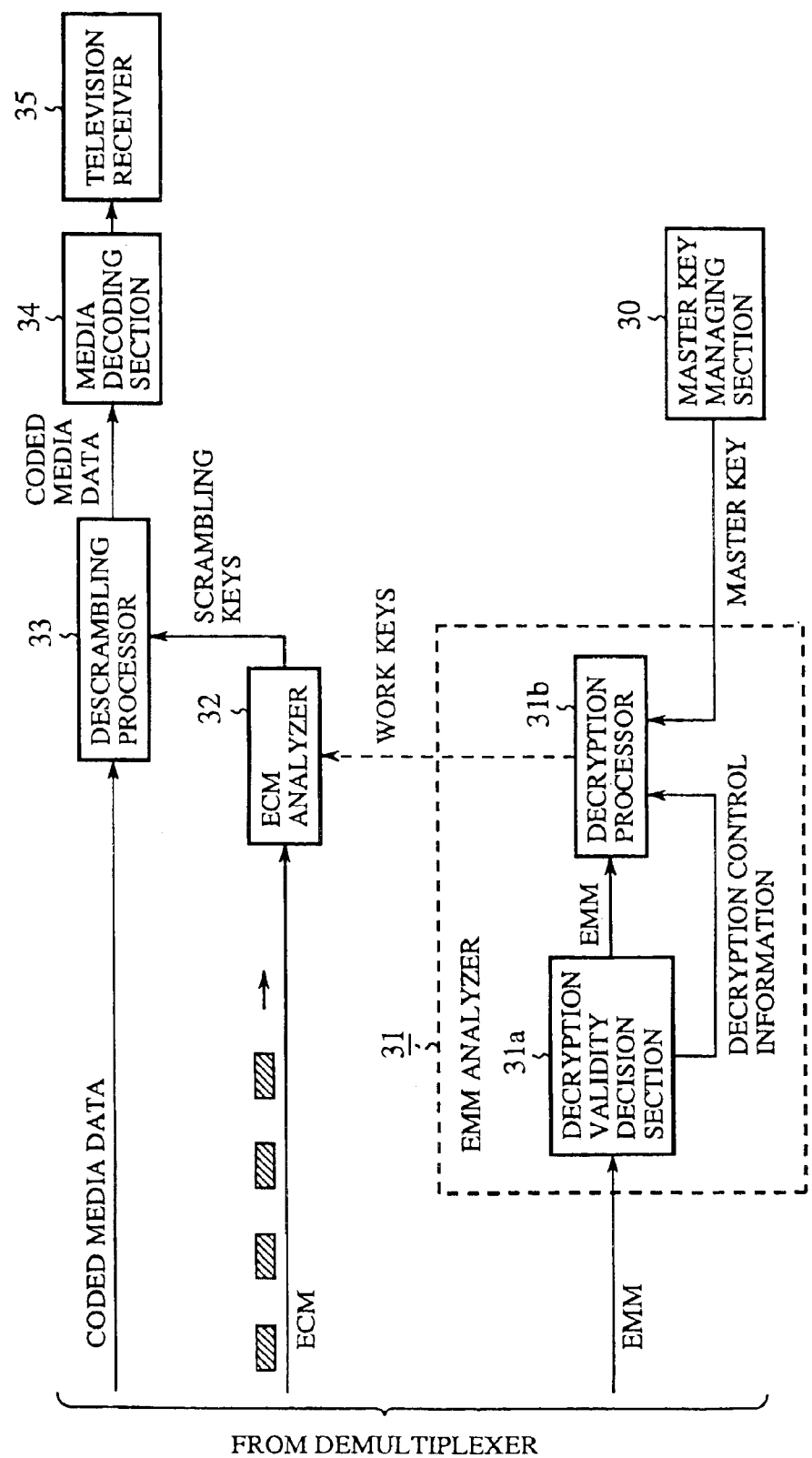
FIG. 8 is a block diagram showing an internal configuration of the EMM analyzer 31 of an embodiment 8 of the conditional access system in accordance with the present invention.

FIG. 8 is a block diagram showing an internal configuration of the EMM analyzer 31 in an embodiment 8 of the conditional access system in accordance with the present invention, in which the same reference numerals designate the same or like portions to those of FIG. 2, and the description thereof is omitted here.

In FIG. 8, the reference numeral 31a designates a decryption validity decision section for retrieving the subscriber contract information and partial viewing authorization information from the EMM output from the demultiplexer 29, and for generating decryption control information for controlling the decryption processing of the work keys in response to the subscriber contract information and partial viewing authorization information; and 31b designates a decryption processor for decrypting the EMM using the master key only when the decryption control information enables the decryption of the work keys, and for retrieving the work keys from the EMM.

Next, the operation of the present embodiment 8 will be described.

Although the ECM analyzer 32 controls the decryption processing of the ECM in response to the subscriber contract information and partial viewing authorization information in the foregoing embodiment 1, this is not essential. Instead of this, for example, the EMM analyzer 31 can control the decryption processing of the EMM in response to the subscriber contract information and partial viewing authorization information, achieving an advantage similar to that of the foregoing embodiment 1.

More specifically, the decryption validity decision section 31a retrieves the subscriber contract information and partial viewing authorization information from the EMM output from the demultiplexer 29. Since the subscriber contract information and partial viewing authorization information are not usually encrypted, they can be referred to without passing through the decryption processing.

When the subscriber contract information authorizes viewing, the decryption validity decision section 31a supplies the decryption processor 31b with the decryption control information enabling the decryption of the work keys regardless of the content of the partial viewing authorization information.

In this case, the decryption processor 31b decrypts the EMM using the master key, retrieves the work keys from the EMM, and supplies them to the ECM analyzer 32.

On the other hand, when the subscriber contract information inhibits viewing and the partial viewing authorization information permits partial viewing, the decryption validity decision section 31a supplies the decryption processor 31b with the decryption control information alternately enabling and disabling the decryption of the work keys.

In this case, the decryption processor 31b decrypts the EMM intermittently, retrieves some of the work keys included in the EMM, and supplies them to the ECM analyzer 32.

When both the subscriber contract information and partial viewing authorization information inhibit viewing, the decryption validity decision section 31a supplies the decryption processor 31b with the decryption control information disabling the decryption of the work keys.

In this case, the decryption processor 31b does not retrieve any work keys from the EMM.

Thus, during intervals in which the work keys are not retrieved, the coded media data cannot be properly descrambled because the scrambling keys are not correctly retrieved from the ECM. Accordingly, the television receiver 35 displays only partially correct pictures as in the foregoing embodiment 1.

Embodiment 9

Figure 9:
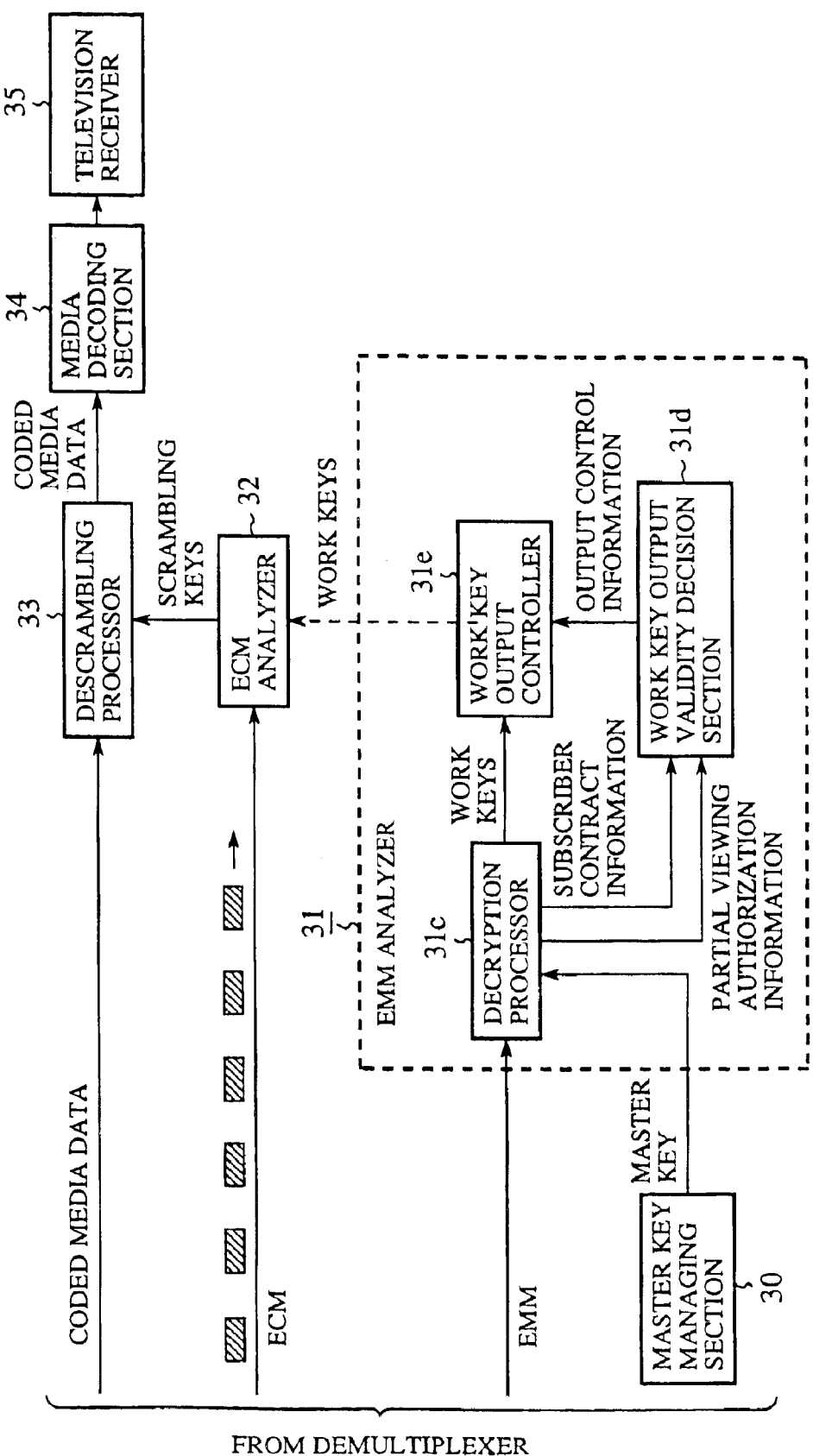
FIG. 9 is a block diagram showing an internal configuration of the EMM analyzer 31 of an embodiment 9 of the conditional access system in accordance with the present invention.
Figure 10:
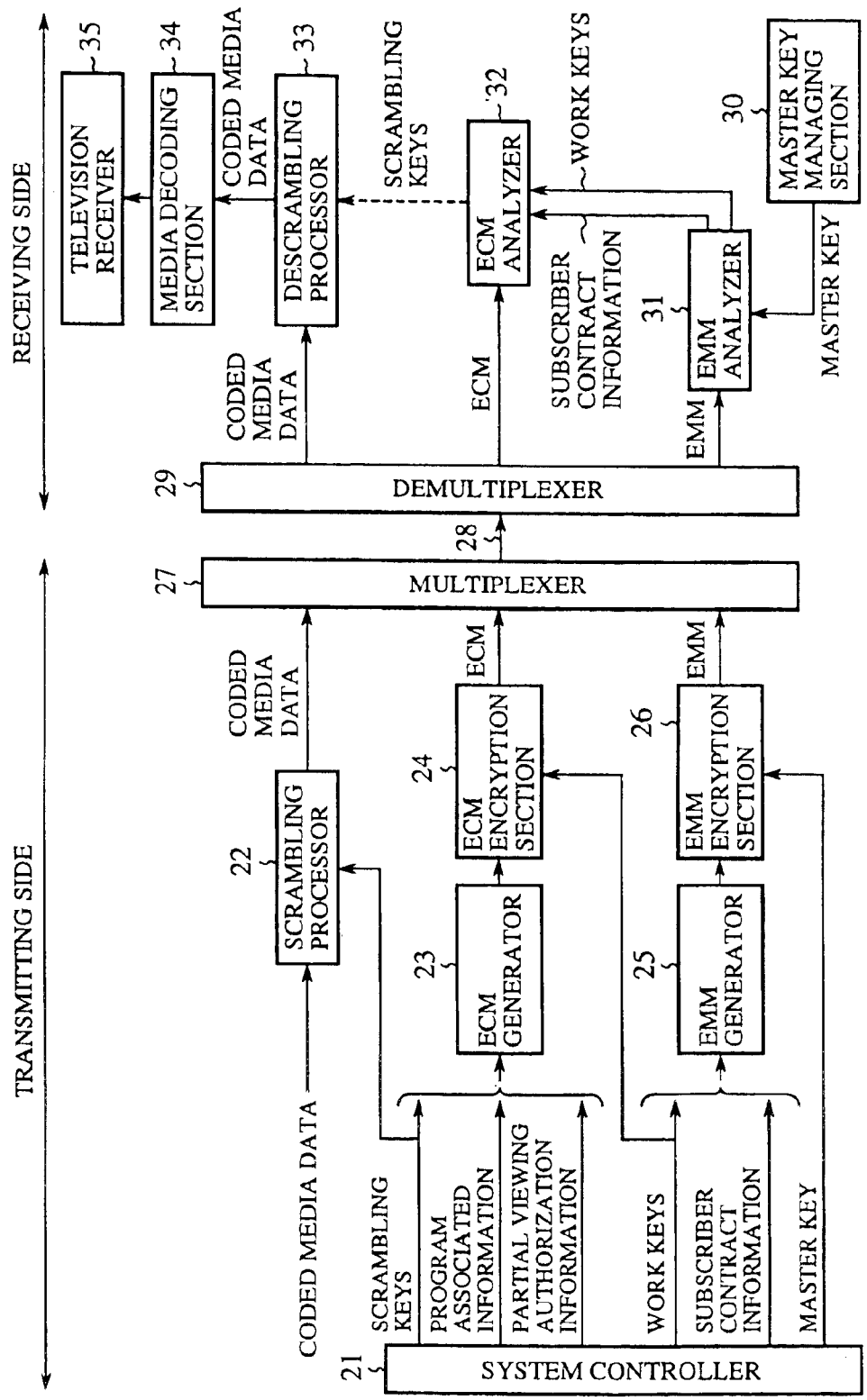
FIG. 10 is a block diagram showing a configuration of an embodiment 10 of the conditional access system in accordance with the present invention.

FIG. 9 is a block diagram showing an internal configuration of the EMM analyzer 31 in an embodiment of the conditional access system in accordance with the present invention, in which the same reference numerals designate the same or like portions to those of FIG. 8, and the description thereof is omitted here.

In FIG. 9, the reference numeral 31c designates a decryption processor for retrieving the subscriber contract information and partial viewing authorization information from the EMM output from the demultiplexer 29, for decrypting the EMM using the master key, and for retrieving the work keys from the EMM; 31d designates a work key output validity decision section for generating output control information for controlling the output of the work keys in response to the subscriber contract information and partial viewing authorization information; and 31e designates a work key output controller for supplying the ECM analyzer 32 with the work keys retrieved by the decryption processor 31c only when the output control information enables the output of the work keys.

Although the decryption processing of the EMM is controlled in response to the subscriber contract information and partial viewing authorization information in the foregoing embodiment 8, this is not essential. For example, the output processing of the work keys rather than the decryption processing of the EMM can be controlled in response to the subscriber contract information and partial viewing authorization information, achieving an advantage similar to that of the foregoing embodiment 8.

More specifically, when the decryption processor 31c retrieves from the EMM the subscriber contract information and partial viewing authorization information, it supplies them to the work key output validity decision section 31d, and when the decryption processor 31c retrieves the work keys from the EMM using the master key, it supplies the work keys to the work key output controller 31e.

When the subscriber contract information authorizes viewing, the work key output validity decision section 31d supplies the work key output controller 31e with the output control information enabling the output of the work keys regardless of the content of the partial viewing authorization information.

In this case, the work key output controller 31e supplies the ECM analyzer 32 with all the work keys output from the decryption processor 31c.

On the other hand, when the subscriber contract information inhibits viewing and the partial viewing authorization information permits partial viewing, the work key output validity decision section 31d supplies the work key output controller 31e with the output control information alternately enabling and disabling the output of the work keys.

In this case, the work key output controller 31e supplies the ECM analyzer 32 with part of the work keys output from the decryption processor 31c.

When both the subscriber contract information and partial viewing authorization information inhibit viewing, the work key output validity decision section 31d supplies the work key output controller 31e with the output control information disabling the output of the work key.

In this case, the work key output controller 31e does not supply the ECM analyzer 32 with any of the work keys output from the decryption processor 31c.

Embodiment 10

Although the partial viewing authorization information is inserted into the EMM to be transmitted in the foregoing embodiments 1–7, this is not essential. For example, the partial viewing authorization information can be inserted into the ECM to be transmitted.

In this case, the ECM analyzer 32 rather than the EMM analyzer 31 retrieves the partial viewing authorization information from the ECM, making it possible to achieve the view control as in the foregoing embodiments 1–7.

The view control can be carried out on a program by program basis for all the receivers simultaneously or for each group of receivers.

Embodiment 11

Although the partial viewing authorization information transmitted from the transmitting side controls the receiving side EMM analyzer 31, ECM analyzer 32 and descrambling processor 33 or media decoding section 34 in the foregoing embodiments 1–10, the partial viewing authorization information can further include a control parameter indicating a partial view authorized range.

This makes it possible for the transmitting side to control various receiving side operations such as the frequency of decrypting the work keys, that of decrypting the scrambling keys, that of decrypting the coded media data, the degree of changing the order of the blocks of the coded media data or the frequency of decoding the coded media data. As a result, transmitting side can control the information amount obtainable from the pictures displayed on the television receiver 35.

Embodiment 12

Figure 11:
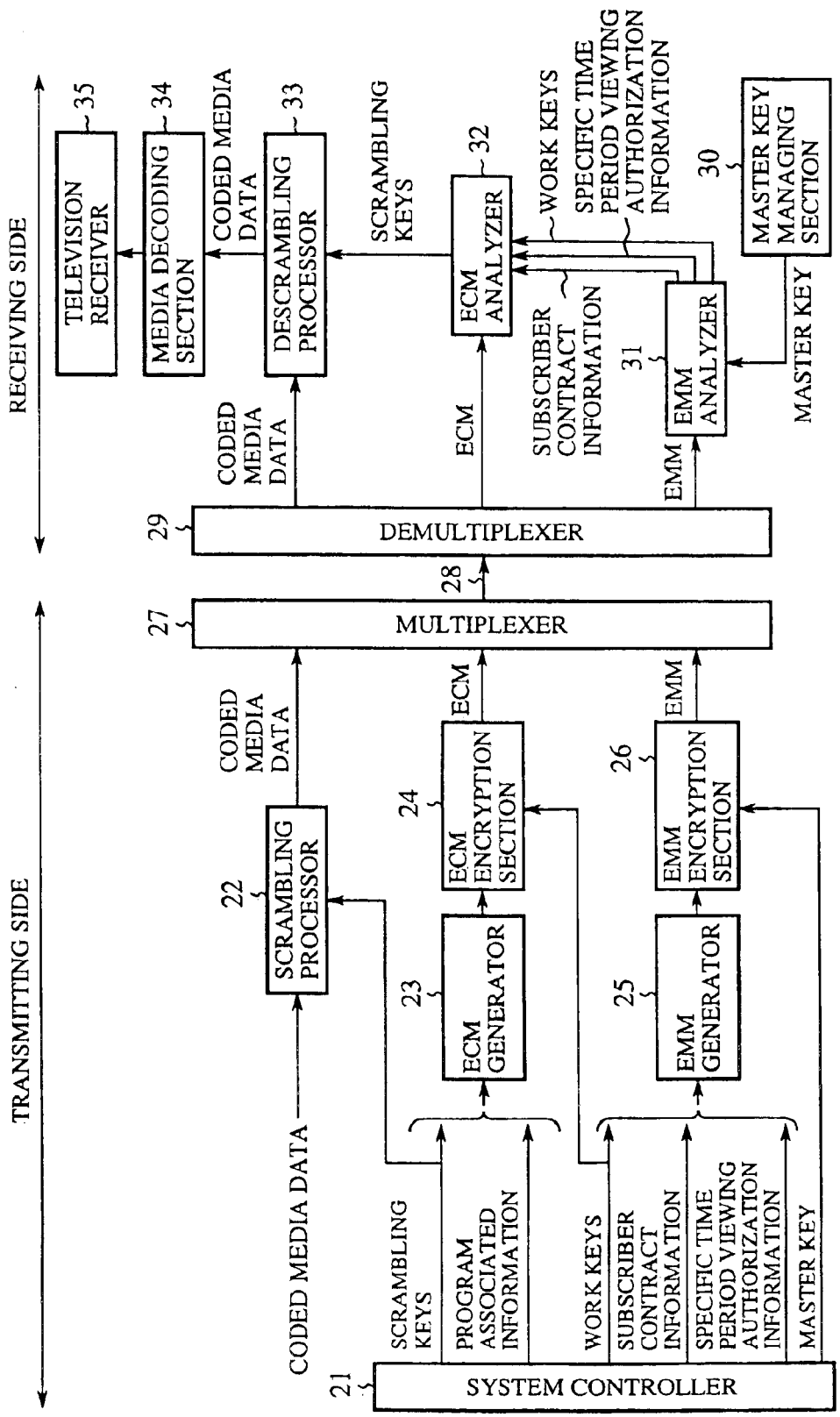
FIG. 11 is a block diagram showing a configuration of an embodiment 12 of the conditional access system in accordance with the present invention.
Figure 12:
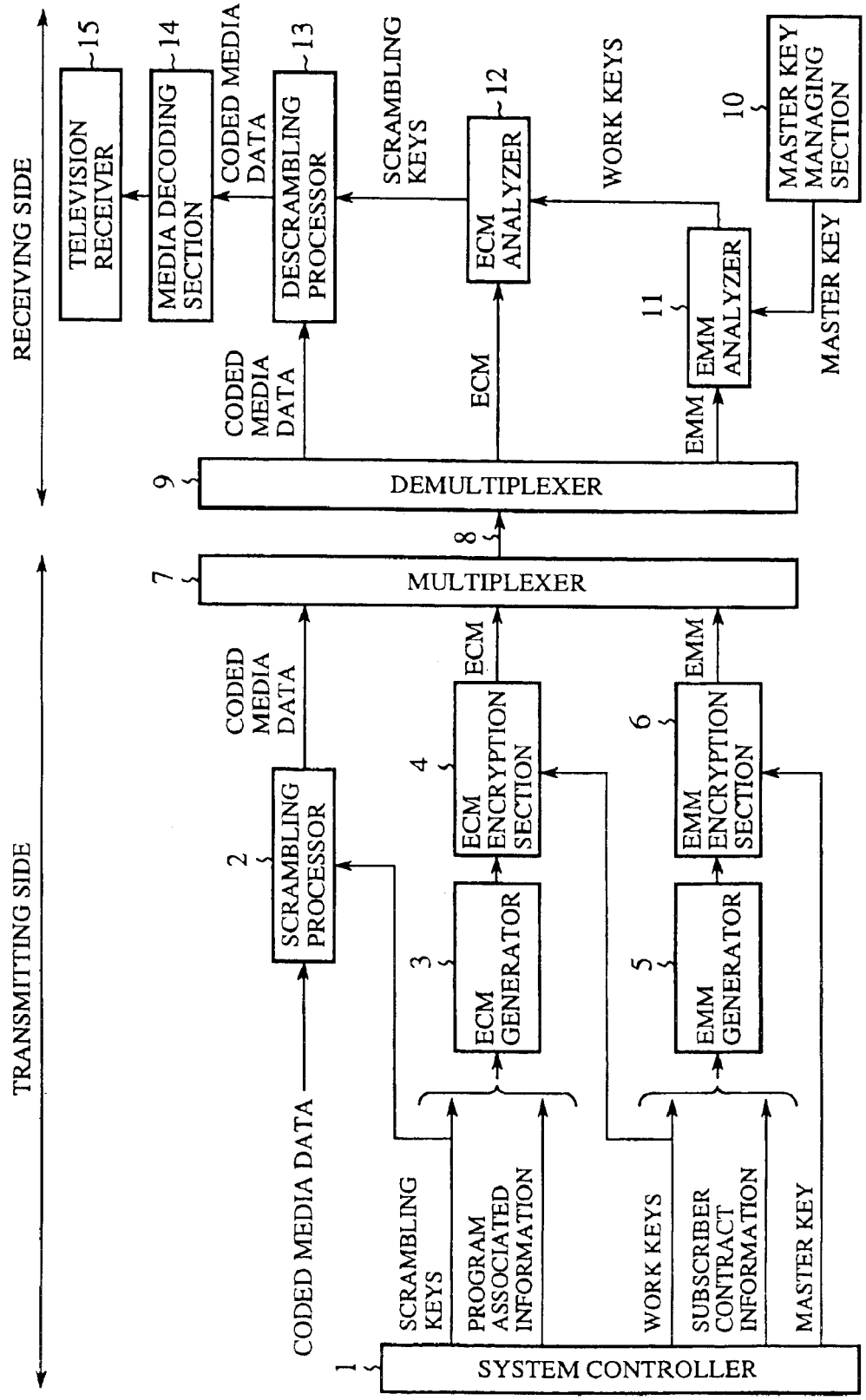
FIG. 12 is a block diagram showing a configuration of a conventional conditional access system.

Although the receiving side displays pictures partially in response to the partial viewing authorization information transmitted from the foregoing embodiments 1–11, this is not essential. For example, the receiving side can display pictures only during a specific time period by using specific time period viewing authorization information (information authorizing viewing for a specific time period) as the partial viewing authorization information as shown in FIG. 11.

More specifically, the transmitting side inserts into the EMM the specific time period viewing authorization information that authorizes viewing only for a specific time period as the partial viewing authorization information and encrypts it. Receiving it, the receiving side retrieves from the EMM the specific time period viewing authorization information, and carries out for only the specific time period the retrieval of the scrambling keys and work keys, and the decryption and decoding of the coded media data.

This makes it possible for a noncontract users to view the program normally for only the specific time period.

Since the EMM is transmitted for each receiver, inserting the specific time period viewing authorization information into the EMM makes it easier for each receiver to manage the viewing validity control in the specific time period. On the other hand, inserting the specific time period viewing authorization information into the ECM makes it easy for all the receivers or for each group of the receivers to manage the authorization information.

Furthermore, since the EMM and ECM are multiplexed into a video signal or voice signal to be transmitted simultaneously, the receiving side can receive the specific time period viewing authorization information without providing any new storage for temporarily holding the specific time period viewing authorization information. This makes it possible to limit the scale of additional devices to a minimum for implementing the viewing validity control in the specific time period.

Embodiment 13

Although the subscriber contract information and the partial viewing authorization information are separately transmitted in the foregoing embodiments 1–11, this is not essential. For example, it is possible not to transmit the partial viewing authorization information separately from the subscriber contract information, but to transmit subscriber contract information authorizing partial viewing.

More specifically, when the transmitting side sends the EMM to noncontract receivers, the system controller 21 inserts into the subscriber contract information not only parameters authorizing or inhibiting viewing, but also parameters authorizing viewing for a specific time period or parameters for authorizing periodic viewing at the time when the system controller 21 supplies the subscriber contract information to the EMM generator 25.

This causes the subscriber contract information to bear on the information corresponding to the partial viewing authorization information, and hence makes it possible for the receiving side to carry out the view control as in the foregoing embodiments 1–11 by retrieving the subscriber contract information from the EMM.

Embodiment 14

Although the receiving side partially displays pictures by receiving the partial viewing authorization information in the foregoing embodiments 1–11, the transmitting side can send the work keys by inserting them into the EMM only for a specific time period.

More specifically, by transmitting the EMM including the work keys only for the time period authorizing the receiving side to display pictures, the receiving side can correctly display pictures only for the time period it can retrieve the work keys from the EMM. In particular, this makes it possible for the receiving side to implement the viewing control as in the foregoing embodiments 1–11 without controlling the EMM analyzer 31, ECM analyzer 32, descrambling processor 33 or media decoding section 34.

Embodiment 15

Although the embodiments 1–14 do not refer to the specifications of the multiplexer 27, demultiplexer 29 and media decoding section 34, they can be based on the MPEG-2 standard.

This makes it possible to construct a conditional access system based on the MPEG-2 standard.

Embodiment 16

Although the number of programs to be transmitted from the transmitting side is not referred to in the foregoing embodiments 1–15, a plurality of programs can be multiplexed into the packet stream transmitted from the transmitting side. In this case, the partial viewing authorization or inhibition can be implemented for individual programs independently. This makes it possible for each program to carry out its own viewing control.

What is claimed is:

1. A conditional access system comprising:
   a demultiplexer for demultiplexing a packet stream transmitted from a transmitting site into encrypted coded media data, an ECM (Entitlement Control Message) and an EMM (Entitlement Management Message);
   an EMM decryption section for retrieving work keys and partial viewing authorization information from the EMM extracted by said demultiplexer;
   an ECM decryption section for decrypting the ECM using the work keys and for intermittently retrieving scrambling keys from the ECM, based on receiving control information to alternately enable and disable decrypting, when the partial viewing authorization information retrieved by said EMM decryption section permits partial viewing;
   a media data descrambling section for intermittently descrambling the coded media data using the scrambling keys intermittently retrieved by said ECM decryption section; and
   a decoding section for decoding the coded media data intermittently descrambled by said media data descrambling section.

2. A conditional access system comprising:
   a demultiplexer for demultiplexing a packet stream transmitted from a transmitting site into encrypted coded media data, an ECM (Entitlement Control Message) and an EMM (Entitlement Management Message);
   an EMM decryption section for retrieving work keys and partial viewing authorization information from the EMM extracted by said demultiplexer;
   an ECM decryption section for decrypting the ECM using the work keys and for retrieving scrambling keys from the ECM, when the partial viewing authorization information retrieved by said EMM decryption section permits partial viewing, wherein said ECM decryption section retrieves only part of the scrambling keys included in the ECM;
   a media data descrambling section for intermittently descrambling the coded media data using the scrambling keys which are intermittently retrieved from said ECM decryption section; and
   a decoding section for decoding the coded media data intermittently descrambled by said media data descrambling section.

3. A conditional access system comprising:
   a demultiplexer for demultiplexing a packet stream transmitted from a transmitting site into encrypted coded media data, an ECM (Entitlement Control Message) and an EMM (Entitlement Management Message);
   an EMM decryption section for retrieving work keys and partial viewing authorization information from the EMM extracted by said demultiplexer;
   an ECM decryption section for decrypting the ECM using the work keys and for intermittently retrieving scrambling keys from the ECM, when the partial viewing authorization information retrieved by said EMM decryption section permits partial viewing;
   a media data descrambling section for intermittently descrambling the coded media data using the scrambling keys intermittently retrieved by said ECM decryption section; and
   a decoding section for decoding the coded media data intermittently descrambled by said media data descrambling section;
   wherein said ECM decryption section retrieves all the scrambling keys included in the ECM and supplies said media data descrambling section with only part of the scrambling keys.

4. A conditional access system comprising:
   a demultiplexer for demultiplexing a packet stream transmitted from a transmitting site into encrypted coded media data, an ECM (Entitlement Control Message) and an EMM (Entitlement Management Message);
   an EMM decryption section for retrieving work keys and partial viewing authorization information from the EMM extracted by said demultiplexer;
   an ECM decryption section for decrypting the ECM using the work keys retrieved by said EMM decryption section and for retrieving scrambling keys from the ECM;
   a media data descrambling section for intermittently descrambling the coded media data using the scrambling keys, based on receiving control information to alternately enable and disable descrambling, when the partial viewing authorization information retrieved by said EMM decryption section permits partial viewing; and
   a decoding section for decoding the coded media data intermittently descrambled by said media data descrambling section.

5. The conditional access system according to claim 4, wherein said media data descrambling section handles part of the coded media data which is not descrambled as unencrypted data.

6. A conditional access system comprising:
   a demultiplexer for demultiplexing a packet stream transmitted from a transmitting site into encrypted coded media data, an ECM (Entitlement Control Message) and an EMM (Entitlement Management Message);
   an EMM decryption section for retrieving work keys and partial viewing authorization information from the EMM extracted by said demultiplexer;
   an ECM decryption section for decrypting the ECM using the work keys retrieved by said EMM decryption section and for retrieving scrambling keys from the ECM;
   a media data descrambling section for descrambling the coded media data using the scrambling keys retrieved by said ECM decryption section; and
   a decoding section for intermittently decoding the coded media data descrambled by said media data descrambling section, based on receiving control information to alternately enable and disable decoding, when the partial viewing authorization information retrieved by said EMM decryption section permits partial viewing.

7. The conditional access system according to claim 6, wherein said decoding section decodes only part of frames in a frame sequence constituting the coded media data.

8. The conditional access system according to claim 7, wherein said decoding section decodes only I frames.

9. A conditional access system comprising:
- a demultiplexer for demultiplexing a packet stream transmitted from a transmitting site into encrypted coded media data, an ECM (Entitlement Control Message) and an EMM (Entitlement Management Message);
- an EMM decryption section for retrieving work keys and partial viewing authorization information from the EMM extracted by said demultiplexer;
- an ECM decryption section for decrypting the ECM using the work keys retrieved by said EMM decryption section and for retrieving scrambling keys from the ECM;
- a media data descrambling section for descrambling the coded media data using the scrambling keys retrieved by said ECM decryption section; and
- a decoding section for intermittently decoding the coded media data descrambled by said media data descrambling section when the partial viewing authorization information retrieved by said EMM decryption section permits partial viewing;
- wherein said decoding section decodes all the coded media data descrambled by said media data descrambling section and supplies only part of the decoded coded media data to a television receiver.

10. A conditional access system comprising:
- a demultiplexer for demultiplexing a packet stream transmitted from a transmitting site into encrypted coded media data, an ECM (Entitlement Control Message) and an EMM (Entitlement Management Message);
- an EMM decryption section for retrieving partial viewing authorization information from the EMM extracted by said demultiplexer, said EMM decryption section intermittently retrieving work keys from the EMM, based on receiving control information to alternately enable and disable decryption, when the partial viewing authorization information permits partial viewing;
- an ECM decryption section for intermittently decrypting the ECM using the work keys intermittently retrieved by said EMM decryption section and for intermittently retrieving scrambling keys from the ECM;
- a media data descrambling section for intermittently descrambling the coded media data using the scrambling keys intermittently retrieved by said ECM decryption section; and
- a decoding section for decoding the coded media data intermittently descrambled by said media data descrambling section.

11. The conditional access system according to claim 10, wherein said EMM decryption section retrieves only part of the work keys included in the EMM.

12. A conditional access system comprising:
- a demultiplexer for demultiplexing a packet stream transmitted from a transmitting site into encrypted coded media data, an ECM (Entitlement Control Message) and an EMM (Entitlement Management Message);
- an EMM decryption section for retrieving partial viewing authorization information from the EMM extracted by said demultiplexer, said EMM decryption section retrieving work keys from the EMM when the partial viewing authorization information permits partial viewing;
- an ECM decryption section for intermittently decrypting the ECM using the work keys which are intermittently retrieved from said EMM decryption section and for intermittently retrieving scrambling keys from the ECM, wherein said EMM decryption section retrieves all the work keys included in the EMM and supplies only part of the work keys to said ECM decryption section;
- a media data descrambling section for intermittently descrambling the coded media data using the scrambling keys intermittently retrieved by said ECM decryption section; and
- a decoding section for decoding the coded media data intermittently descrambled by said media data descrambling section.

13. A conditional access system comprising:
- a demultiplexer for demultiplexing a packet stream transmitted from a transmitting site into encrypted coded media data, an ECM (Entitlement Control Message) and an EMM (Entitlement Management Message);
- an EMM decryption section for retrieving work keys and partial viewing authorization information from the EMM extracted by said demultiplexer;
- an ECM decryption section for decrypting the ECM using the work keys and for intermittently retrieving scrambling keys from the ECM, when the partial viewing authorization information retrieved by said EMM decryption section permits partial viewing;
- a media data descrambling section for intermittently descrambling the coded media data using the scrambling keys intermittently retrieved by said ECM decryption section; and a decoding section for decoding the coded media data intermittently descrambled by said media data descrambling section;
- wherein said ECM decryption section, instead of said EMM decryption section, retrieves the partial viewing authorization information from the ECM when the partial viewing authorization information is included in the ECM.

14. The conditional access system according to claim 1, wherein partial viewing authorization information includes a control parameter indicating a partially authorized viewable range.

15. The conditional access system according to claim 1, wherein the partial viewing authorization information consists of information authorizing viewing only for a specific time period.

16. The conditional access system according to claim 1, wherein a subscriber contract information that includes information authorizing partial viewing is used as the partial viewing authorization information.

17. The conditional access system according to claim 1, wherein the EMM is used for inserting the work keys which are used only for specific time periods.

18. The conditional access system according to claim 1, wherein said demultiplexer and said decoding section are based on the MPEG-2 standard.

19. The conditional access system according to claim 1, wherein when a plurality of programs are multiplexed into the packet stream transmitted from the transmitting site, authorization, partial authorization and inhibition of viewing the programs are determined for individual programs independently.

* * * * *

UNITED STATES PATENT AND TRADEMARK OFFICE
CERTIFICATE OF CORRECTION

PATENT NO. : 6,920,222 B1
APPLICATION NO. : 09/641512
DATED : July 19, 2005
INVENTOR(S) : Daisuke Tsukahara et al.

It is certified that error appears in the above-identified patent and that said Letters Patent is hereby corrected as shown below:

Title page, item [73] insert the following assignee's name:

--Mitsubishi Denki Kabushiki Kaisha; Tokyo, Japan--

Signed and Sealed this

Seventh Day of April, 2009

JOHN DOLL
*Acting Director of the United States Patent and Trademark Office*